(12) United States Patent
Hattori et al.

(10) Patent No.: US 6,760,086 B2
(45) Date of Patent: Jul. 6, 2004

(54) ATTACHMENT FILM FOR ELECTRONIC DISPLAY DEVICE

(75) Inventors: Takuma Hattori, Shizuoka (JP);
Masami Yanagisawa, Shizuoka (JP);
Keiichiro Haji, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/273,261

(22) Filed: Mar. 22, 1999

(65) Prior Publication Data

US 2003/0089516 A1 May 15, 2003

(30) Foreign Application Priority Data

Mar. 26, 1998 (JP) .......................................... 10-098405
Mar. 11, 1999 (JP) .......................................... 11-065305
Mar. 11, 1999 (JP) .......................................... 11-065306

(51) Int. Cl.$^7$ .......................................... G02F 1/1333
(52) U.S. Cl. ........................................................ 349/122
(58) Field of Search ............................... 349/122, 116, 349/64, 110; 430/5, 7, 14; 428/329, 141, 428; 166/318.6; 359/599; 362/31

(56) References Cited

U.S. PATENT DOCUMENTS

| | | | | |
|---|---|---|---|---|
| 5,200,477 A | * | 4/1993 | Baker et al. .................... 526/74 |
| 5,356,949 A | * | 10/1994 | Komiyama et al. .......... 522/102 |
| 5,370,930 A | * | 12/1994 | Ito .............................. 428/335 |
| 5,620,819 A | * | 4/1997 | Conforti et al. ............... 430/14 |
| 5,739,946 A | * | 4/1998 | Iwanaga et al. ............. 359/296 |
| 5,783,299 A | * | 7/1998 | Miyashita et al. ........... 428/329 |
| 5,786,042 A | * | 7/1998 | Inoue et al. .................... 428/1 |
| 5,800,952 A | * | 9/1998 | Urano et al. .................... 430/7 |
| 5,876,854 A | * | 3/1999 | Kawazu et al. ............. 428/428 |
| 5,889,569 A | * | 3/1999 | Okamoto et al. ........... 349/110 |
| 5,968,244 A | * | 10/1999 | Ueda et al. ............... 106/31.86 |
| 6,025,097 A | * | 2/2000 | Drumm .......................... 430/7 |
| 6,030,689 A | * | 2/2000 | Matshbaguchi et al. .... 428/141 |
| 6,071,653 A | * | 6/2000 | Lin ................................ 430/5 |
| 6,111,699 A | * | 8/2000 | Iwata et al. .................. 359/599 |
| 6,147,732 A | * | 11/2000 | Aoyama et al. ............ 349/112 |
| 6,164,785 A | * | 12/2000 | Maekawa .................... 359/613 |
| 6,217,176 B1 | * | 4/2001 | Maekawa .................... 359/601 |

FOREIGN PATENT DOCUMENTS

JP      63-276540    * 11/1988
JP      2000-265133    * 9/2000

* cited by examiner

*Primary Examiner*—Dung Nguyen
(74) *Attorney, Agent, or Firm*—Wenderoth, Lind & Ponack, LLP (57) ABSTRACT

An attachment film for an electronic display, which film is used for adjusting the optical transmissivity in a variety of electronic displays and adjusting color shades. It permits the simple and easy adjustment of the reflection of a fluorescent lamp and sunlight in and from the screen thereof and can prevent the formation of air bubbles in an adhesive layer thereof. The attachment film includes a transparent substrate and an adhesive layer which contains carbon black dispersed therein and formed on one surface of a transparent substrate.

10 Claims, 2 Drawing Sheets

ATTACHMENT FILM FOR ELECTRONIC DISPLAY DEVICE

BACKGROUND OF THE INVENTION

1. Field of the Invention

The present invention relates to an attachment film for use in electronic displays such as Cathode Ray Tube (CRT) and a liquid crystal display device. More specifically, it relates to a an attachment film for an electronic display, which is for adjusting the quantity of transmitted light from a light source and the scattering of transmitted light and for preventing the reflection of a fluorescent lamp and sun light in and from a display device screen.

2. Description of the Prior Art

Conventionally, a glass unit as a screen of a display device such as a plasma display or TV cathode ray tube contains a colorant such as carbon black. The colorant is used for adjusting the quantity of transmitted light from a light source. For example, in a cathode ray tube having a fluorescent material which forms a color by the irradiation with electron beams, white is formed by mixing three colors such as red, green and blue, and black is formed in a color-non-forming portion. As a result, the cathode ray tube has a characteristic that the intensity of white is high and the intensity of black is low. A glass unit as a display device screen is therefore colored in gray for controlling white and intensifying black. In recent years, there are increasingly used displays having a cathode ray tube, etc., of which the light source side is formed as a curved surface and the viewer side, i.e., the front side is formed as a flat surface. In a display of the above type, the screen of a glass unit has a small thickness in the central portion thereof, and the thickness increases toward circumferential portions. In the above glass unit having a change in thickness, the central portion is required to be colored densely, and it is required to decrease the coloring toward the circumferential portions, for accomplishing a uniform optical transmissivity and a uniform scattering ratio of the glass unit on the entire screen of the glass unit. However, the decreasing the coloring toward the circumferential portions of the glass unit makes its production process complicated and requires an additional cost. Further, it is required to alter a gray scale variously depending upon a colorant used or a display material used. The coloring of the glass unit for satisfying the above demands is liable to make the production process thereof complicated and incur an increase in its production cost. Further, with an increase in the size of a display, a fluorescent lamp and sun light is reflected in the screen to a greater extent, and it is more intensely demanded to prevent the above reflection. When the optical transmissivity and the scattering ratio of the glass unit as a display device screen does not match a display material, a black and white contrast is deteriorated, and images showing original hues can be no longer viewed. It has been also found according to further studies that an adhesive layer of a film attached to the surface of an electronic display suffers air bubbles in some cases. More specifically, it has been found that air bubbles are formed in an adhesive layer in a light resistance test using the irradiation with ultraviolet light. The formation of air bubbles downgrades displayed images.

SUMMARY OF THE INVENTION

It is an object of the present invention to provide an attachment film for an electronic display, which film is used for adjusting the optical transmissivity depending upon a variety of electronic displays and adjusting color shades.

It is another object of the present invention to provide an attachment film for an electronic display, which film permits the simple and easy adjustment of the reflection of a fluorescent lamp and sun light in and from the screen thereof.

It is further another object of the present invention to provide an attachment film for an electronic display, which film can serve to adjust the optical transmissivity, adjust color tones and prevent the reflection of a fluorescent lamp and sun light in a screen even when the electronic display is increased in size.

It is still further another object of the present invention to provide an attachment film for an electronic display, which film can prevent the formation of air bubbles in an adhesive layer thereof.

According to the present invention, there is provided an attachment film for an electronic display, which comprises an adhesive layer which contains carbon black dispersed therein and is formed on one surface of a transparent substrate.

According to the present invention, there is provided an attachment film according to the above, wherein the adhesive layer further contains a coloring pigment different from the carbon black.

According to the present invention, there is provided an attachment film according to the above, wherein the attachment film is colored in neutral gray.

According to the present invention, there is provided an attachment film according to the above, wherein the carbon black in the adhesive layer has an average particle diameter of 30 nm or less and has a BET specific surface area of at least 100 m$^2$/g.

According to the present invention, there is provided an attachment film according to the above, wherein the adhesive layer contains an acrylic adhesive having a carboxyl group and/or a hydroxyl group and the carbon black is an acidic carbon black.

According to the present invention, there is provided an attachment film according to the above, wherein the adhesive layer further contains a photopolymerizable compound and a photopolymerization initiator.

According to the present invention, there is provided an attachment film according to the above, wherein the adhesive layer is formed on one surface of the transparent substrate and a hard coating layer and an anti-reflection layer are consecutively formed on the other surface of the transparent substrate.

DETAILED DESCRIPTION OF THE INVENTION

Figure 1:
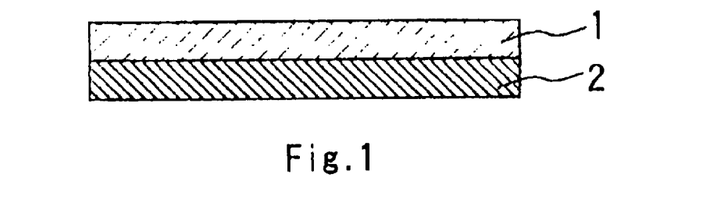
FIG. 1 depicts a film of the present invention where adhesive layer 2 is formed on one surface of a transparent substrate 1.
Figure 2:
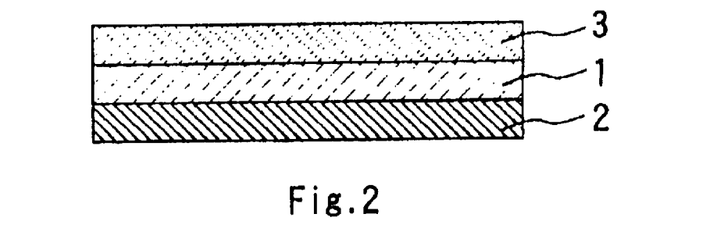
FIG. 2 and FIG. 3 depict a film of the present invention where anti-reflection layer 3 is formed on one surface or each surface, respectively, of the transparent substrate 1.
Figure 3:
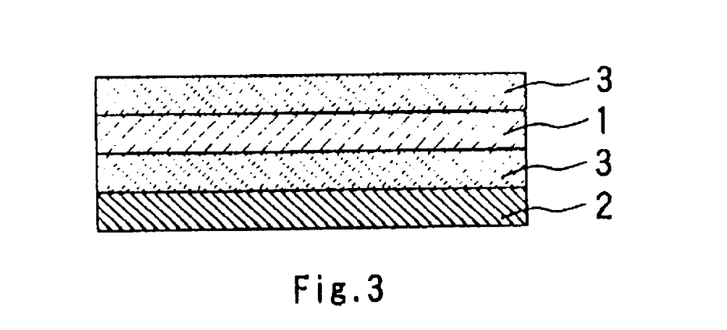
Figure 4:
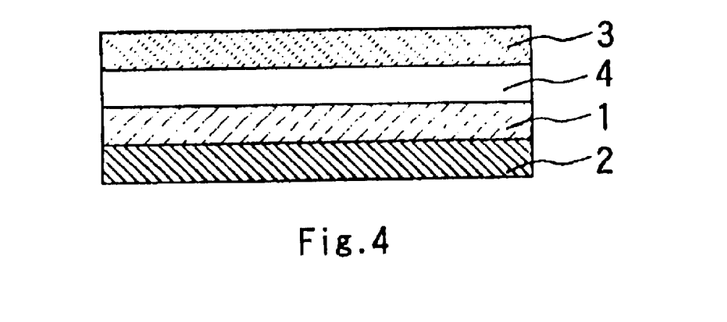
FIG. 4 depicts a film of the present invention where adhesive layer 2 is formed on one surface of the transparent substrate 1 and a hard coating layer 4 and an anti-reflection layer 3 are consecutively formed on the other surface of the transparent substrate 1.
Figure 5:
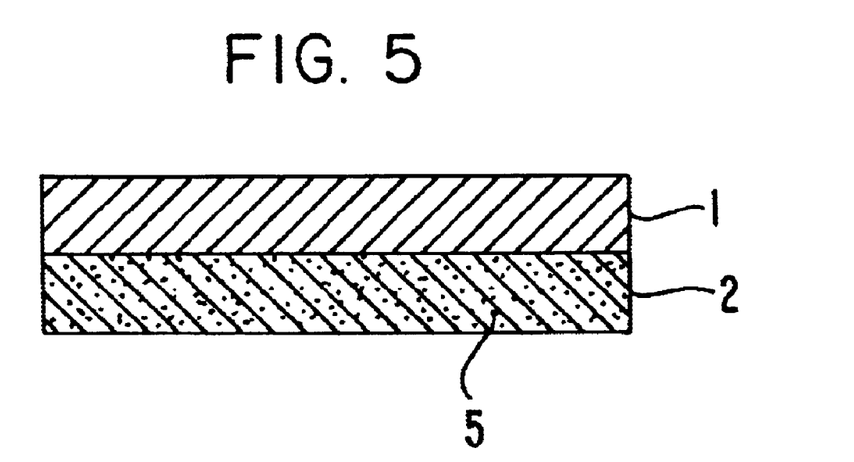
FIG. 5 depicts a film of the present invention as in FIG. 1 where adhesive layer 2 contains pigment 5 dispersed therein. The pigment can be carbon black alone or with a further pigment i.e., a coloring pigment such as a red or blue pigment.

The present inventors have made diligent studies, and as a result, it has been found that the above objects can be achieved by a film obtained by forming an adhesive layer containing a colorant on one surface of a substrate. That is, the present invention provides an attachment film for a display, which comprises a substrate and an adhesive layer formed on one surface of a substrate, the adhesive layer containing carbon black dispersed in the adhesive layer. Further, according to another aspect of the present invention, there is provided an attachment film for an electronic display, in which the adhesive layer contains a photopolymerizable compound and a photopolymerization initiator in addition to the adhesive and the carbon black. Further, according to still another aspect of the present invention, there is provided an attachment film for a display, in which the carbon black of the adhesive layer has an average particle diameter of 30 nm or less, preferably 20 nm or less, and has a BET specific surface area of at least 100 m$^2$/g, preferably at least 250 m$^2$/g.

The display referred to in the present invention preferably means a display in which an image display portion on the viewer (watcher) side has a flat surface at least along the lateral axis direction or the vertical axis direction, such as a display having a display portion on the viewer side which display portion is flat both along the lateral axis direction and the vertical axis direction, or a display having a display portion on the viewer side which display portion is curved along the vertical axis direction, i.e., cylindrical. The display to which the present invention can be applied includes various electronic displayes such as a liquid crystal display (LCD), a plasma display (PDP), a CRT, an electroluminescence (EL), and the like.

The substrate used in the present invention is preferably selected from colorless transparent films. However, the color shade can be adjusted by properly incorporating various colorants into an adhesive layer, and the presence of a color shade to some extent is therefore tolerable. The films used in the present invention include a polyethylene terephthalate (PET) film, a triacetyl cellulose (TAC) film, a polyallylate film, a polyimide film, a polyether film, a polycarbonate film, a polysulfone film, a polyether sulfone film, a cellophane film, an aromatic polyamide film, a polyethylene film, a polypropylene film and a polyvinyl alcohol film. Particular preferred are a PET film and a TAC film. The transparent substrate has a thickness of 20 to 300 μm, preferably 50 to 200 μm.

For preventing the reflection of an external incident light, an anti-reflection layer may be formed on one surface or both surfaces of the transparent substrate. The anti-reflection layer is generally formed by forming layers having different refractive indices. There may be employed a conventionally known method in which a low-refractivity layer is formed on the surface of the transparent substrate and a high-refractivity layer and a low-refractivity layer are consecutively formed. As a low-refractivity layer, a layer of siloxane, or the like can be formed, and a high-refractivity layer can be formed from an inorganic material such as a metal or a metal oxide by deposition or sputtering. A low-refractivity layer is generally formed by a solvent coating method. For example, there may be employed a method of attaining a low refractivity in which a fluorine-containing material is used, or a method of attaining a low refractivity in which fine particles are deposited on a film surface to form empty pores so that air is contained.

When an anti-reflection layer is to be formed, it is preferred to form a hard coating layer on the transparent substrate surface prior to the formation of the anti-reflection layer. That is because the surface of the film used as a transparent substrate is soft so that it is liable to be damaged during the formation of the anti-reflection layer. It is also because the anti-reflection layer itself has the properties of being hard and fragile. Damage on the film downgrades displayed images. The hard coating layer is generally formed of a ultraviolet-light-curable acrylic resin.

For improving the transparent substrate in adhesion to the anti-reflection layer, the hard coating layer or the adhesive layer, it is preferred to carry out surface modification treatment on the transparent substrate. The surface modification treatment can be selected from surface treatments such as alkali treatment, corona treatment, plasma treatment, fluorine treatment, sputtering treatment or application of a surface active agent or a silane coupling agent, as required.

For preventing soiling such as the adherence of dust on a display surface, an antistatic layer may be formed on an outer side of the transparent substrate. The antistatic layer can be formed, as required, by a method in which a very thin film of a metal such as aluminum, tin, etc., or a metal oxide such as ITO is formed by deposition or sputtering, or by a method in which fine particles or whiskers of a metal such as aluminum, tin, etc., or fine particles of metal oxide such as tin oxide doped with antimony, etc., are dispersed in a polyester resin or an acrylic resin and the resultant dispersion is coated.

The attachment film for a display, provided by the present invention, is attached, for example, to a flat display on the viewer (watcher) side, i.e., on the side opposite to the color-forming light source, and it is used for a long period of time. The attachment film is therefore required to retain weatherability and light resistance for a long period of time. For satisfying the above requirement, conventionally known additives such as an ultraviolet absorbent, a photo-stabilizer, a metal inactivating agent and an ozone-deterioration preventer may be added to the adhesive layer, the antistatic layer, etc., as required. The carbon black suitable for use in the present invention has an average particle diameter of, preferably, 30 nm or less, more preferably 20 nm or less, and a BET specific surface area of at least 100 m$^2$/g, more preferably at least 250 m$^2$/g. For adjusting the transmissivity and the scattering ratio of an image display portion to proper ranges, it is preferred that the carbon black should have an average particle diameter and a BET specific surface area in the above ranges. Further, more preferably, the carbon black used in the present invention has the following properties; It shows a high oil absorption amount, it is an acidic carbon having a pH of 4 or less, and it has a volatile content of at least 10% by weight. Carbon blacks which have the above properties are easily commercially available. For example, there are "Color Black FW200 (average particle diameter 13 nm, BET specific surface area 460 m$^2$/g, pH 2.5)", "Special Black 4 (25 nm, 180 m$^2$/g, pH 3.0)", "Color Black HW2 (13 nm, 460 m$^2$/g, pH 2.5)" and "Special Black 6 (17 nm, 300 m$^2$/g, pH 2.5)", "Special Black 5 (20 nm, 240 m$^2$/g, pH 3)" (these are all supplied by Degussa, Germany), "#2350 (15 nm, 260 m$^2$/g, pH 2)", "#2400 (15 nm, 260 m$^2$/g, pH2)", "#1000 (18 nm, 200 m$^2$/g, pH 3)" and "#970 (16 nm, 250 m$^2$/g, pH 3.5)" (these are all supplied by Mitsubishi Chemical Co., Ltd.), "MONARCH 1300 (13 nm, 560 m$^2$/g, Ph 3)", "MONARCH 1400 (13 nm, 560 m$^2$/g, pH 3)", "MONARCH 1000 (16 nm, 340 m$^2$/g, pH 3)", "Black Pearls 1300 (13 nm, 560 m$^2$/g, pH 3)", "Black Pearls 1400 (13 nm, 560 m$^2$/g, pH 3)", "Black Pearls 1000 (16 nm, 340 m$^2$/g, pH 3)", "MOGUL L (24 nm, 140 m$^2$/g, pH 4)" and "Black Pearls L (24 nm, 140 m$^2$/g, pH 4)" (these are all supplied by Cabbot), and "Raven 7000 (11 nm, 640 m$^2$/g, pH 3)", "Raven 5750 (12 nm, 620 m$^2$/g, pH 3)", "Raven 5000 (8 nm, 580 m$^2$/g, pH 3)", "Raven 3500 (13 nm, 380 m$^2$/g, pH 4)" and "Raven 5250 (16 nm, 590 m²/g, pH 3) " (these are all supplied by Columbia). When the adhesive has a carboxyl group or a hydroxyl group, it is preferred to use an acidic carbon. The carbon preferably has a pH of 4 or less. An acidic carbon is obtained by oxidizing a carbon surface.

In the present invention, the light scattering ratio is also expressed as a haze. The haze is a value determined by the following equation using measurement data.

Haze (%)=(intensity of scattered light/intensity of all of transmitted light)×100

Generally, it is said that the color tone of a glass unit as an image display portion is desirably of neutral gray. Neutral gray means a hue having an a-value and a b-value which are nearly zero in the expression of a hue by Lab. More specifically, it means a hue having an a-value and a b-value of within ±5, preferably an a-value of within ±3 and a b-value of within ±4, more preferably, an a-value of +1 to −2.5 and a b-value of within ±3.5. When each of the a-value and the b-value exceeds the above ranges, the display color of the display is affected, and the reproduction of a color is downgraded. When a carbon black alone is added to the adhesive layer, an intended hue is not obtained in some cases, a brown hue is liable to be formed, some color-forming material impairs a black and white contrast, or various hues may be impaired in some cases. Therefore, a pigment is added for adjusting the hue of the attachment film depending upon requirements caused by a change in a color-forming material. As a pigment, it is preferred to use a pigment having an average particle diameter of 0.01 to 5 μm, more preferably 0.01 to 1 μm.

Examples of the pigment preferred in the present invention include isoindolinone pigments, anthraquinone pigments, dioxazine pigments, azo pigments, naphthol pigments, quinophthalone pigments, azomethine pigments, benzimidazolone pigments, perinone pigments, pyranthrone pigments, quinacridone pigments, perylene pigments, phthalocyanine pigments and durene pigments. Preferred are red pigments such as dioxazine pigments, azo pigments, naphthol pigments and quinacridone pigments and blue pigments such as phthalocyanine pigments. The most preferred are quinacridone pigments, dioxazine pigments and phthalocyanine pigments. These pigments may be used in combination as required for obtaining an intended hue.

For adjusting the hue, a dye may be incorporated. However, a dye is poor in weatherability, and it cause a large change in transmissivity when used for a long period of time. A dye is therefore not suitable for use in the present invention.

The adhesive used in the present invention preferably has the property of being re-separable and leaves no component when peeled off. Further, it is preferably free of peeling and the occurrence of bubbles during an accelerated aging test under a high-temperature and high-humidity environment. The adhesive having the above properties can be properly selected from acrylic adhesives, rubber-based adhesives, polyvinyl ether adhesives and silicone adhesives as required. Acrylic adhesives are the most preferred.

An acrylic adhesive is obtained by copolymerizing an alkyl (meth)acrylate with a polymerizable unsaturated carboxylic acid or a hydroxyl-group-containing ethylenically unsaturated monomer or further with a copolymerizable vinyl monomer in a solvent. The polymerization is preferably carried out by a radical polymerization method. Preferably, the polymerization method includes a solution polymerization method, a suspension polymerization method and an emulsion polymerization method. A copolymer obtained by the above polymerization preferably has a number average molecular weight, measured by gel permeation chromatography, of 10,000 to 1,000,000, preferably 50,000 to 500,000, more preferably 100,000 to 400,000. When the above number average molecular weight is less than 10,000, it is difficult to uniformly form a resin composition layer. When it exceeds 1,000,000, a copolymer had a high elasticity and it is difficult to adjust a coating amount.

The alkyl (meth)acrylate contains an alkyl group having 1 to 12 carbon atoms, and it includes methyl (meth)acrylate, butyl (meth)acrylate, octyl (meth)acrylate and the like. More specifically, the methacrylate component includes methyl methacrylate, ethyl methacrylate, n-propyl methacrylate, isopropyl methacrylate, n-hexyl methacrylate, cyclohexyl methacrylate, 2-ethylhexyl methacrylate, n-octyl methacrylate, isooctyl methacrylate and lauryl methacrylate. The acrylate component includes methyl acrylate, ethyl acrylate, propyl acrylate, butyl acrylate, n-hexyl acrylate, 2-ethylhexyl acrylate, n-octyl acrylate and lauryl acrylate. The above (meth)acrylates may be used alone or in combination. A (meth)acrylate monomer having a carboxyl group and/or a hydroxyl group serves to improve the dispersibility of the carbon. The dispersibility is further improved when an acidic carbon is used.

The above monomer having a carboxyl group and/or a hydroxyl group includes monomers having a carboxyl group such as (meth)acrylic acid, maleic acid, itaconic acid, crotonic acid, and monomers having a hydroxyl group such as 2-hydroxyethyl acrylate, 2-hydroxypropyl acrylate and 2-hydroxyvinyl ether. These may be used alone or in combination with the above acrylate component and/or the above methacrylate component. When the adhesive has a carboxyl group or a hydroxyl group, it is preferred to use an acidic carbon. The pH of the carbon is preferably 4 or less.

The adhesive may contain a crosslinking agent. The amount of the crosslinking agent is generally 0.01 to 10 parts by weight per 100 parts by weight of the adhesive. The crosslinking agent includes isocyanate compounds, aluminum chelate compounds, aziridinyl compounds and epoxy compounds.

The photopolymerizable compound to be incorporated into the adhesive includes a photopolymerizable monomer having at least 2 acryloyl groups per molecule, a photopolymerizable oligomer having at least 2 acryloyl groups per molecule, a photopolymerizable unsaturated polyester oligomer and a photopolymerizable oligomer having at least 2 epoxy groups per molecule. These are used alone or in combination. The photopolymerizable monomer and/or oligomer having at least 2 acryloyl groups per molecule include dicylcopentenyl diacrylate, dicyclopentenyloxyethyl diacrylate, 1,3-butanediol (meth)acrylate, 1,4-butanediol (meth)acrylate, diethylene glycol (meth)acrylate, 1,6-hexanediol (meth)acrylate, tripropylene glycol di(meth)acrylate, trimethylolpropane tri(meth)acrylate, tetramethylolmethane tetra(meth)acrylate, and pentaerythritol (meth)acrylate. The photopolymerizable oligomer having at least 2 acryloyl groups per molecule includes oligomers of polyester acrylates, epoxy acrylates, polyurethane acrylates, alkyd acrylates and silicone acrylates. The above (meth)acrylate monomres and/or oligomrs are preferably used for the adhesive containing a (meth)acrylate polymer. The photopolymerizable unsaturated polyester oligomer includes a polyester oligomer formed from a glycol and an unsaturated dicarboxylic acid such as maleic acid, fumaric acid or itaconic acid, an ester obtained from a bisphenol A ethylene oxide adduct and fumaric acid, isophthalic acid. The photopolymerizable oligomer having at least 2 epoxy groups per molecule includes a bisphenol A type epoxy resin and bisglycidyl ethers of polyethylene glycol. The amount of the photopolymerizable monomer and/or oligomer per 100 parts by weight of the adhesive (solid content) is 0.1 to 10 parts by weight, preferably 0.5 to 7 parts by weight, more preferably 1 to 5 parts by weight. When the amount of the photopolymerizable monomer and/or oligomer exceeds the above upper limit, it is difficult to handle the adhesive layer. When it is less than the lower limit, it is not much expected to have an effect on the prevention of the occurrence of air bubbles.

The photopolymerization initiator includes diphenyl sulfide, anthracene, benzophenone, diphenyl disulfide, diacetylhexachlorobutadiene, benzoin, benzoin ethyl ether, benzoin isopropyl ether, benzoin n-butyl ether, benzoin phenyl ether, benzyl diphenyl disulfide, azobisisobutyronitrile, dibenzyl, anthraquinone, naphthoquinone, p,p'-bis(dimethylamino)benzophenone, benzoyl peroxide, benzyl ketal, 1,1-dichloroacetophenone, 2-chlorothioxanthone, 2-methylthioxanthone, 2,2-diethoxyacetophenone, 2,2-dimethoxy-2-phenylacetophenone, 2,2-dichloro-4-phenoxyacetophenone, Michler's kentone, hydroxyisobutylphenone, 1-(4-isopropylphenyl)-2-hydroxy-2-methyl-1-propanone, 2-methyl-(4-isopropylphenyl)-2-hydroxy-2-methyl-1-propanone, 2-methyl-(4-methylthiophenyl)-2-morpholino-1-propanone, Luecocrystal Violet, tribromophenylsulfone, tribromomethylphenylsulfone, p-methoxyphenol and Victoria Pure Blue. These may be used in combination as riquired. Of these, benzoion ether compounds, benzophenone compounds, acetophenone compounds and thioxanthone compounds are preferred. The amount of the photopolymerization initiator per 100 parts by weight of the photopolymerizable monomer and/or oligomer is 0.1 to 10 parts by weight, preferably 0.1 to 5 parts by weight.

The adhesive is prepared in the form of an organic solvent solution and applied to a transparent substrate with a coating machine such as a roll coater or a reverse coater. A film or paper treated to be separable may be laminated on the adhesive layer surface of the transparent substrate, for handling conveniences.

EFFECT OF THE INVENTION

According to the present invention, the transmissivity and the hue of light from a light source for color formation can be easily, simply and inexpensively adjusted by attaching a transparent substrate on which an adhesive layer containing carbon black and optionally an organic pigment is formed to the outer surface of a glass unit of an image display device. Further, there can be provided an attachment film for an electronic display which film has excellent light resistance, by incorporating a photopolymerizable compound and a photopolymerization initiator to the adhesive layer.

The present invention will be explained more in detail with reference to Examples hereinafter.

PREPARATION EXAMPLES

Polymerization Example of Acryl Polymer (a)

A flask having a thermometer, a stirrer, a reflux cooling tube and a nitrogen-introducing tube was charged with 94 parts by weight of n-butyl acrylate, 6 parts of acrylic acid, 0.3 part by weight of benzoyl peroxide, 40 parts by weight of ethyl acetate and 60 parts by weight of toluene, and then nitrogen was introduced through the nitrogen-introducing tube to provide a nitrogen atmosphere in the flask. Then, the contents were heated up to 65° C., and polymerization was carried out, for 10 hours, to give an acryl polymer solution having a weight average molecular weight of approximately 1,200,000 (number average molecular weight of approximately 300,000) and a Tg of about −49° C. Ethyl acetate was added to the acryl polymer solution such that the resultant solution had a solid content of 20% by weight, whereby an acryl polymer solution (a) for a master batch was obtained. To 100 parts by weight (as a solid content) of the solution was added 0.1 part by weight of N,N,N',N'-tetraglycidyl-m-xylylenediamine, to give an adhesive coating liquid (a').

Polymerization Example of Acryl Polymer (b)

A flask having a thermometer, a stirrer, a reflux cooling tube and a nitrogen-introducing tube was charged with 96 parts by weight of n-butyl acrylate, 3 parts by weight of acrylic acid, a 1 part by weight of 2-hydroxyethyl acrylate, 0.3 part by weight of benzoyl peroxide, 40 parts by weight of ethyl acetate and 60 parts by weight of toluene, and then nitrogen was introduced through the nitrogen-introducing tube to provide a nitrogen atmosphere in the flask. Then, the contents were heated up to 65° C., and polymerization was carried out, for 10 hours, to give an acryl polymer having a weight average molecular weight of approximately 1,000,000 (number average molecular weight of approximately 260,000) and a Tg of about −50° C. Ethyl acetate was added to the acryl polymer solution such that the resultant solution had a solid content of 20% by weight, whereby an acryl polymer solution (b) for a master batch was obtained. To 100 parts by weight (as a solid content) of the solution was added 0.5 part by weight of polyisocyanate ("Coronate L", supplied by Nippon Polyurethane, to give an adhesive coating liquid (b').

Example 1

To 100 parts by weight (as a solid content) of the acryl polymer solution a for a master batch was added 6 parts by weight of carbon black ("Special Black 6" supplied by Degussa, primary particle diameter 17 nm, BET specific surface area 300 m$^2$/g, volatile content 18% by weight, pH 2.5), and the mixture was fully stirred to obtain a master batch solution A in which carbon black was fully dispersed.

0.2 Part by weight of the master batch solution A was added to 100 parts by weight of the adhesive coating liquid (a') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated by ITO sputtering to form an anti-reflection layer on one surface thereof, and the adhesive layer surface of the above film was attached to a non-treated surface of the above-treated transparent PET film having a thickness of 188 μm, to give a colored adhesive film of the present invention.

Example 2

A master batch solution B was prepared in the same manner as in Example 1 except that the carbon black was changed from Special Black 6 to Color Black FW200 (supplied by Degussa, primary particle diameter 13 nm, BET specific surface area 460 m$^2$/g, volatile content 20% by weight, pH 2.5).

0.5 Part by weight of the master batch solution B was added to 100 parts by weight of the adhesive coating liquid (a') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated for the prevention of reflection in the same manner as in Example 1, and the adhesive layer surface of the above film was attached to a non-treated surface of the above-treeated transparent PET film having a thickness of 188 μm, to give a colored adhesive film of the present invention.

Example 3

A master batch solution C was prepared in the same manner as in Example 1 except that the carbon black was changed from Special Black 6 to Special Black 4 (supplied by Degussa, primary particle diameter 25 nm, BET specific surface area 180 m²/g, volatile content 14% by weight, pH 3).

0.2 Part by weight of the master batch solution C was added to 100 parts by weight of the adhesive coating liquid (a') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated for the prevention of reflection in the same manner as in Example 1, and the adhesive layer surface of the above film was attached to a non-treated surface of the above-treated transparent PET film having a thickness of 188 μm, to give a colored adhesive film of the present invention.

Example 4

8.5 Parts by weight of carbon black (Color Black FW200) and 5 parts by weight of a blue organic pigment (Monochlorocyanine Blue) were added to 100 parts by weight (as a solid content) of the acryl polymer (b) for a master batch, and the mixture was stirred to obtain a master batch solution D in which the carbon black and the blue pigment were fully dispersed.

0.5 Part by weight of the master batch solution D was added to 100 parts by weight of the adhesive coating liquid (b') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated for the prevention of reflection in the same manner as in Example 1, and the adhesive layer surface of the above film was attached to a non-treated surface of the above-treated transparent PET film having a thickness of 188 μm, to give a colored adhesive film of the present invention.

Example 5

A master batch solution E was prepared in the same manner as in Example 4 except that 5 parts by weight of the blue organic pigment (Monochlorocyanine Blue) was replaced with 5 parts by weight of a red organic pigment (Quinacridone Red).

0.5 Part by weight of the master batch solution E was added to 100 parts by weight of the adhesive coating liquid (b') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent triacetyl cellulose (TAC) film was treated for the prevention of reflection by applying siloxane, and the adhesive layer surface of the above film was attached to a non-treated surface of the above-treated transparent TAC film having a thickness of 80 μm, to give a colored adhesive film of the present invention.

Example 6

7.5 Parts by weight of carbon black (Color Black FW200), 4.5 parts by weight of a blue organic pigment (Monochlorocyanine Blue) and 2.2 parts by weight of a red organic pigment (Quinacridone Red) were added to 100 parts by weight (as a solid content) of the acryl polymer solution b for a master batch, and the mixture was stirred to obtain a master batch solution F in which the carbon black, the blue pigment and the red pigment were fully dispersed.

0.5 Part by weight of the master batch solution F was added to 100 parts by weight of the adhesive coating liquid (b') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated for the prevention of reflection in the same manner as in Example 1, and the adhesive layer surface of the above film was attached to a non-treated surface of the above-treated transparent PET film having a thickness of 188 μm, to give a colored adhesive film of the present invention.

Example 7

A colored adhesive film of the present invention was obtained in the same manner as in Example 6 except that the red pigment (Quinacridone Red) was changed to 2.5 parts by weight of a dioxazine pigment and that the blue pigment (Monochlorocyanine Blue) was changed to 4.0 parts by weight of a phthalocyanine pigment.

Comparative Example 1

A solution of 0.48 part by weight of a spiron dye (metal complex) (TK-Smoke, supplied by Toa Kasei) was added to 100 parts by weight of the adhesive coating liquid (b') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated for the prevention of reflection in the same manner as in Example 1, and the adhesive layer surface of the above film was attached to a non-treated surface of the above-treated transparent PET film having a thickness of 188 μm, to give a comparative colored adhesive film.

Comparative Example 2

A solution of 0.48 part by weight of a spiron dye (metal complex) (TK-Smoke, supplied by Toa Kasei) and 0.4 part by weight of an ultraviolet absorbent ("TINUVIN 109", supplied by Ciba Geigy AG) were added to 100 parts by weight of the adhesive coating liquid (a') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A transparent PET film was treated for the prevention of reflection in the same manner as in Example 1, and the adhesive layer surface of the above film was attached to a non-treated surface of the above-treated transparent PET film having a thickness of 188 μm, to give a comparative colored adhesive film.

<Preparation of Sample for Evaluation>

The PET film (38 μm) which had been treated to be separable was separated from each of the colored adhesive films obtained in Examples and Comparative Examples, and colored adhesive films were attached to glass plates (microslide glass, supplied by Matsunami Glass Co.) to prepare samples for evaluation for carrying out the following tests.

Discoloration Test with Fademeter

A sample for evaluation was set in a fademeter (Ultraviolet long life—fademeter FAL-AU model, supplied by Suga Testing Machinery, ultraviolet light was generated by ultraviolet light carbon arc) such that the colored adhesive film side was exposed, and after 400 hours, the sample was measured for a transmissivity and a haze.

Measurement of Transmissivity

Before and after a sample was set in the fademeter, the sample was measured, from the colored adhesive film side, for a transmissivity to light having a wavelength of 550 nm with a spectrophotometer (Visible-ultraviolet spectrophotometer UVDEC-670 model, supplied by Nippon Bunko Kogyosha).

Measurement of Haze

Before and after a sample was set in the fademeter, the sample was measured for a haze from the colored adhesive film side with a haze meter (Haze Meter NDH2000, supplied by Nippon Denshokusha).

Table 1 shows the results of transmissivity and haze measurements of the above samples for evaluation.

TABLE 1

|  | Before setting in fademeter | | 400 Hours after setting in fademeter | |
| --- | --- | --- | --- | --- |
|  | Transmissivity (%) | Haze | Transmissivity (%) | Haze |
| Ex. 1 | 71.5 | 1.9 | 71.8 | 1.8 |
| Ex. 2 | 58.2 | 1.6 | 58.3 | 1.7 |
| Ex. 3 | 82.2 | 2.1 | 83.4 | 2.2 |
| Ex. 4 | 56.3 | 2.5 | 57.0 | 2.3 |
| Ex. 5 | 57.4 | 2.7 | 57.8 | 2.6 |
| Ex. 6 | 56.2 | 2.5 | 56.7 | 2.6 |
| Ex. 7 | 57.6 | 2.6 | 57.7 | 2.6 |
| CEx. 1 | 43.5 | 0.8 | 58.9 | 1.1 |
| CEx. 2 | 41.2 | 0.9 | 50.7 | 1.1 |

Ex. = Example, CEx. = Comparative Example

It is preferred that there should be no difference between the transmissivity and the haze before setting in the fademeter and those after testing with the fademeter, and the haze is preferably 3 or less. Each comparative sample showed large differences between the transmissivity data before setting in the fademeter and those after testing with the fademeter.

The colored adhesive films obtained in Examples and Comparative Examples were evaluated for a black and white contrast as follows. A colored adhesive film was attached to a left half of a cylindrical screen of a color graphic display ("D1726T-HS", supplied by DELL) for a personal computer, and the black and white contrast on each of the left half and the right half of the screen was visually evaluated while the display was set to have a high brightness. Further, the reflection of a fluorescent lamp (room lamp) in the display at a standard brightness was visually evaluated.

When the colored adhesive films of the present invention were attached, black and white were clearly distinguished on the screen as compared with a case where no film was attached, and the black and white contrast was excellent. Further, the reflection of the fluorescent lamp in the screen to which each of the colored adhesive films of the present invention was attached was inhibited as compared with a case where no film was attached.

Example 8

0.2 Part by weight of the same master batch solution A as the master batch solution A prepared in Example 1, 2 parts by weight, per 100 parts by weight of a solid content of an adhesive, of trimethylolpropane acrylate (monomer) and 0.06 part by weight of a benzophenone photopolymerization initiator were added to 100 parts by weight of the adhesive coating liquid (a') (adhesive concentration 20% by weight), and the mixture was stirred to form a homogeneous solution. Then, the solution was applied to a treated surface of a 38 μm thick transparent PET film which had been treated to be separable, such that a dry adhesive layer had a thickness of 25 μm, and the resultant layer was dried. A hard coating was formed on a transparent PET film, and the resultant PET film was treated by ITO sputtering to form an anti-reflection layer on one surface thereof (thickness 188 μm, layer structure: anti-reflection layer/hard coating layer/PET film). The adhesive layer surface of the above film was attached to a non-treated surface of the above PET film, to give a colored adhesive film of the present invention.

Example 9

0.5 Part by weight of the same master batch solution B as the master batch solution B prepared in Example 2, 1 part by weight, per 100 parts by weight of a solid content of an adhesive, of trimethylolpropane acrylate (monomer) and 0.03 part by weight of a acetophenone photopolymerization initiator were added to 100 parts by weight of the adhesive coating liquid (a') (adhesive concentration 20% by weight), and the mixture was stirred to form a homogeneous solution. Then, the solution was applied to a treated surface of a 38 μm thick transparent PET film which had been treated to be separable, such that a dry adhesive layer had a thickness of 25 μm, and the resultant layer was dried. A hard coating was formed on a transparent PET film, and the resultant PET film was treated for the prevention of reflection, in the same manner as in Example 8 (thickness 188 μm). The adhesive layer surface of the above film was attached to a non-treated surface of the above PET film, to give a colored adhesive film of the present invention.

Example 10

0.2 Part by weight of the same master batch solution C as the master batch solution C prepared in Example 3, 4 parts by weight, per 100 parts by weight of a solid content of an adhesive, of pentaerythritol trimethacrylate (monomer) and 0.12 part by weight of a thioxanthone photopolymerization initiator were added to 100 parts by weight of the adhesive coating liquid (a') (adhesive concentration 20% by weight), and the mixture was stirred to form a homogeneous solution. Then, the solution was applied to a treated surface of a 38 μm thick transparent PET film which had been treated to be separable, such that a dry adhesive layer had a thickness of 25 μm, and the resultant layer was dried. A hard coating was formed on a transparent PET film, and the resultant PET film was treated for the prevention of reflection, in the same manner as in Example 8 (thickness 188 μm). The adhesive layer surface of the above film was attached to a non-treated surface of the above PET film, to give a colored adhesive film of the present invention.

Example 11

0.5 Part by weight of the same master batch solution F as the master batch solution F prepared in Example 6, 3 parts by weight, per 100 parts by weight of a solid content of an adhesive, of tetramethylolmethan tetraacrylate (monomer) and 0.09 part by weight of a benzoin ether photopolymerization initiator were added to 100 parts by weight of the adhesive coating liquid (b') (adhesive concentration 20% by weight), and the mixture was stirred to form a homogeneous solution. Then, the solution was applied to a treated surface of a 38 μm thick transparent PET film which had been treated to be separable, such that a dry adhesive layer had a thickness of 25 μm, and the resultant layer was dried. A hard coating was formed on a transparent PET film, and the resultant PET film was treated for the prevention of reflection, in the same manner as in Example 8 (thickness 188 μm). The adhesive layer surface of the above film was attached to a non-treated surface of the above PET film, to give a colored adhesive film of the present invention.

Example 12

A colored adhesive film of the present invention was obtained in the same manner as in Example 11 except that 3 parts by weight of the tetramethylolmethane tetraacrylate (monomer) was replaced with 3 parts by weight of urethane acrylate oligomer.

Comparative Example 3

A solution of 0.48 part by weight of a spiron dye (metal complex) (TK-Smoke, supplied by Toa Kasei) was added to 100 parts by weight of the adhesive coating liquid (b') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A hard coating was formed on a transparent PET film, and the PET film was treated for the prevention of reflection, in the same manner as in Example 8, and the adhesive layer surface of the above film was attached to a non-treated surface of the above-treated transparent PET film (thickness of 188 μm), to give a comparative colored adhesive film.

Comparative Example 4

A solution of 0.48 part by weight of a spiron dye (metal complex) (TK-Smoke, supplied by Toa Kasei) and 0.4 parts by weight of an ultraviolet absorbent ("TINUVIN 109", supplied by Ciba Geigy AG) were added to 100 parts by weight of the adhesive coating liquid (a') (adhesive concentration 20% by weight), and the mixture was stirred so as to form a homogeneous solution. Then, the solution was applied to a 38 μm thick PET film which had been treated to be separable, such that a dry adhesive layer had a thickness of 25 μm, and the resultant layer was dried. A hard coating was formed on a transparent PET film, and the PET film was treated for the prevention of reflection, in the same manner as in Example 8, and the adhesive layer surface of the above film was attached to a non-treated surface of the above-treated transparent PET film (thickness of 188 μm), to give a comparative colored adhesive film.

Comparative Example 5

A comparative colored adhesive film was prepared in the same manner as in Example 8 except that the trimethylolpropane triacrylate and the photopolymerization initiator were not added.
<Evaluation Methods>
A light resistance test, etc., were carried out as already described. Further, the colored adhesive films obtained in Examples 8 to 12 were evaluated (measured) for a values, b values and air bubbles by the following measurement methods.
a-value and b-value
Measured with a spectrophotometer (Visible-ultraviolet spectrophotometer UVDEC-670 model, supplied by Nippon Bunko Kogyosha).
Evaluation of Air Bubbles
A sample was evaluated for the occurrence of air bubbles by visually observing the sample before setting it in a fademeter and after testing it in the fademeter. A sample having no air bubble was expressed by ○, and a sample having air bubbles was expressed by X.

TABLE 2

|  | Before setting in fademeter | | | 400 Hours after setting in fademeter | | |
| --- | --- | --- | --- | --- | --- | --- |
|  | Transmissivity (%) | Haze | Air bubbles | Transmissivity (%) | Haze | Air bubbles |
| Ex. 8 | 71.5 | 1.9 | ○ | 71.8 | 1.8 | ○ |
| Ex. 9 | 58.2 | 1.6 | ○ | 58.3 | 1.7 | ○ |
| Ex. 10 | 82.2 | 2.1 | ○ | 83.5 | 2.2 | ○ |
| Ex. 11 | 56.2 | 2.5 | ○ | 56.7 | 2.6 | ○ |
| Ex. 12 | 56.6 | 2.4 | ○ | 56.8 | 2.5 | ○ |
| CEx. 3 | 43.5 | 0.8 | ○ | 58.9 | 1.1 | X |
| CEx. 4 | 41.2 | 0.9 | ○ | 50.7 | 1.1 | X |
| CEx. 5 | 71.6 | 1.8 | ○ | 71.6 | 1.7 | X |

Ex. = Example, CEx. = Comparative Example

TABLE 3

|  | a-value | b-value |
| --- | --- | --- |
| Example 8 | +0.23 | +3.45 |
| Example 9 | −2.01 | +3.40 |
| Example 10 | −0.85 | +3.15 |
| Example 11 | −1.37 | +0.92 |
| Example 12 | −1.13 | −0.34 |

In the light resistance test with the fademeter, all of the adhesive films obtained in Comparative Examples 3 to 5 caused air bubbles. It is preferred that there should be no difference between the transmissivity and the haze before setting in the fademeter and those after testing with the fademeter, and the haze is preferably 3 or less. The adhesive films obtained in Comparative Examples 3 and 4 showed large differences between the transmissivity data before setting in the fademeter and those after testing with the fademeter.

The colored adhesive films obtained in Examples and Comparative Examples were evaluated for a black and white contrast as follows. A colored adhesive film was attached to a left half of a flat screen of a CRT ("KV-28SF-7M", supplied by Sony Corporation), and the black and white contrast on each of the left half and the right half of the screen was visually evaluated while the display was set to have a high brightness. Further, the reflection of a fluorescent lamp (room lamp) in the display at a standard brightness was visually evaluated.

When the colored adhesive films of the present invention were attached, black and white were clearly distinguished on the screen as compared with a case where no film was attached, and the black and white contrast was excellent. Further, the reflection of the fluorescent lamp in the screen to which each of the colored adhesive films of the present invention was attached was inhibited as compared with a case where no film was attached.

What is claimed is:

1. An attachment film for an electronic display, which is for adjusting the quantity of transmitted light from a light source and adjusting the black and white contrast, which comprises an adhesive layer which is re-separable and contains carbon black having a pH of 4 or less dispersed therein and contains an acrylic adhesive having a carboxyl group and/or a hydroxyl group and is formed on one surface of a transparent substrate.

2. An attachment film according to claim 1, wherein an anti-reflection layer is formed on one surface or each surface of the transparent substrate.

3. An attachment film according to claim 1, wherein the adhesive layer further contains a coloring pigment different from the carbon black.

4. An attachment film according to claim 3, wherein the coloring pigment is at least one pigment selected from the group consisting of a red pigment and a blue pigment.

5. An attachment film according to claim 1, wherein the attachment film is colored in neutral gray.

6. An attachment film according to claim 5, which has an a-value and b-value which are within ±5 each when measured with a color-difference meter.

7. An attachment film according to claim 1, wherein the carbon black in the adhesive layer has an average particle diameter of 30 nm or less and has a BET specific surface area of at least 100 $m^2/g$.

8. An attachment film according to claim 1, wherein the adhesive layer further contains a photopolymerizable compound and a photopolymerization initiator.

9. The attachment film according to claim 1, wherein the adhesive layer contains a (meth) acrylate resin as an adhesive and a (meth) acrylate monomer or oligomer as the photopolymerizable compound.

10. The attachment film according to claim 1, wherein the adhesive layer is formed on one surface of the transparent substrate and a hard coating layer and an anti-reflection layer are consecutively formed on the other surface of the transparent substrate.

* * * * *